US008615419B2

(12) United States Patent
Eilam et al.

(10) Patent No.: US 8,615,419 B2
(45) Date of Patent: Dec. 24, 2013

(54) METHOD AND APPARATUS FOR PREDICTING CUSTOMER CHURN

(75) Inventors: Barak Eilam, Raanana (IL); Yuval Lubowich, Raanana (IL); Hila Lam, Ramat Gan (IL)

(73) Assignee: Nice Systems Ltd, Ra'anana (IL)

( * ) Notice: Subject to any disclaimer, the term of this patent is extended or adjusted under 35 U.S.C. 154(b) by 885 days.

(21) Appl. No.: 12/116,228

(22) Filed: May 7, 2008

(65) Prior Publication Data
US 2009/0292583 A1 Nov. 26, 2009

(51) Int. Cl.
*G06Q 10/00* (2012.01)
(52) U.S. Cl.
USPC ........................................................ 705/7.29
(58) Field of Classification Search
USPC ............ 705/10, 11, 7.29; 379/265.06, 265.07
See application file for complete search history.

(56) References Cited

U.S. PATENT DOCUMENTS

| | | | | |
|---|---|---|---|---|
| 5,822,410 | A * | 10/1998 | McCausland et al. ... | 379/114.01 |
| 6,609,120 | B1 * | 8/2003 | Honarvar et al. ..................... | 1/1 |
| 6,707,904 | B1 * | 3/2004 | Judkins et al. ........... | 379/265.06 |
| 7,457,404 | B1 * | 11/2008 | Hession et al. .......... | 379/265.07 |
| 2003/0200135 | A1 * | 10/2003 | Wright ............................ | 705/10 |
| 2004/0249650 | A1 * | 12/2004 | Freedman et al. ................ | 705/1 |
| 2005/0154748 | A1 * | 7/2005 | Kraiss ........................... | 707/102 |
| 2006/0265089 | A1 * | 11/2006 | Conway et al. ................. | 700/94 |
| 2008/0189171 | A1 * | 8/2008 | Wasserblat et al. ............. | 705/11 |

OTHER PUBLICATIONS

"NICE Systems—NICE Perform" web site archived at [URL: http://web.archive.org/web/20070311054718/www.nice.com/solutions/enterprise/nice_perform.php], archived on Mar. 11, 2007.*

"NICE Systems—NICE Solutions for the Contact Center" web site archived at [URL: http://web.archive.org/web/20070318022254/www.nice.com/solutions/enterprise/contact_center.php], archived on Mar. 18, 2007.*
NICE Systems Announces NICE SmartCenter™ web site. "NICE Systems Announces NICE SmartCenter™." Retrieved from [URL: http://www.nice.com/content/nice-systems-announces-nice-smartcenter%E2%84%A2], article dated Feb. 21, 2007.*
Adaptive Interaction Analytics Solution Overview—Feb. 2007; www.extranice.com.
Business Analyzer Guide—Jan. 2008; www.extranice.com.
Customer Experience Business Solution—Apr. 2009; www.extranice.com.
Marketing Note 1220—NICE Perform Release 3.5 General Availability—Sep. 2010; www.extranice.com.
NICE Adaptive Interaction Analytics, 2007; www.extranice.com.
NICE Customer Churn Reduction—Sales—Oct. 2010; www.extranice.com.
NICE Churn Reduction brochure; www.extranice.com.
NICE Cross-Channel Interaction Analytics; www.extranice.com.

(Continued)

*Primary Examiner* — Susanna M Meinecke Diaz
(74) *Attorney, Agent, or Firm* — Soroker-Agmon (57) ABSTRACT

A method and apparatus for predicting customer churn from an organization. The method and apparatus determine an interaction churn score based on analyzing an interaction between the customer and the organization and related data. Optionally, the method and apparatus determine also a transactional churn score based on additional data related to the customer or the organization, and a combined churn score based on the interaction churn score and the transactional churn score. The interaction churn score is determined by assessing a categorization score for the interaction in association with one or more categories, and combining the categorization scores. Of further use is a retention offer mechanism for making a retention offer to the customer.

49 Claims, 3 Drawing Sheets

(56) References Cited

OTHER PUBLICATIONS

NICE Perform—Overview of New Capabilities in Release I—Feb. 2005; www.extranice.com.
NICE Perform—What is New in Release II—2006; www.extranice.com.
NICE Perform Release 3 Explaining the Differences between the Applications Suites—Jun. 2008; www.extranice.com.
NICE Perform Brochure—Enterprise—Jul. 2005; www.extranice.com.
NICE Perform Pushing the Performance Level of the Contact Centers—Jul. 2005; www.extranice.com.
NICE Perform R2 and R3 NMS V3.1 User's Guide—Rev. A5—Aug. 2008; www.extranice.com.
NICE Perform Solution Brief—Nov. 2006; www.extranice.com.
NICE Perform Solution Overview—Apr. 2005; www.extranice.com.
NICE Perform What's New in Release 3—Feb. 2008; www.extranice.com.
NICE Smart Center Customer Experience Brochure—Nov. 2010; www.extranice.com.
NICE Smart Center Customer Experience; www.extranice.com.
NICE Smart Center Operational Efficiency; www.extranice.com.
NICE Smart Center Suite Brochure—Nov. 2010; www.extranice.com.
NICE Smart Center suite; www.extranice.com.
Precision Monitoring Whitepaper—Nov. 2005; www.extranice.com.
NICE Perform Release Notes—NP—3.2—Dec. 2010; www.extranice.com.
NICE Perform Release Notes—NP—3.5—Dec. 2010; www.extranice.com.
Revolutionizing Churn Programs with Cross-Channel Interaction Analytics White Paper; www.extranice.com.
Smart Center Solution Overview—Mar. 2008; www.extranice.com.
Speech Analytics Market Report Reprint—Feb. 2010; www.extranice.com.
Using Speech Analytics to Predict Churn—Oct. 2009; www.extranice.com.
Using Speech Analytics to Reduce Churn white paper—Oct. 2009; www.extranice.com.
Versions Comparison—8.9 to NICE Perform R3.2; www.extranice.com.
Versions Comparison—NICE Perform R1 to R3.2; www.extranice.com.
Versions comparison—NICE Perform vs 8 9—Aug. 2007; www.extranice.com.
Versions comparison—NICE Perform vs 8 9—Feb. 2008; www.extranice.com.
What's New in NICE Perform R3 1—Jul. 2008; www.extranice.com.
What's New in NICE Perform R3 5; www.extranice.com.
What's New in NICE Perform R3 Service Pack 4; www.extranice.com.
NICE Smart Center Sales and Marketing Effectiveness; www.extranice.com.

* cited by examiner

METHOD AND APPARATUS FOR PREDICTING CUSTOMER CHURN

TECHNICAL FIELD

The present disclosure relates to call centers in general, and to a method and apparatus for predicting customer churn from organizations, in particular.

BACKGROUND

In many organizations, and particularly organizations comprising or based on call centers, customers are the main if not the only profit source of the organization, and many efforts are invested in conquering new market segments and new customers. However, an absurd situation sometime occurs wherein an organization is more preoccupied with reaching new customers than preventing the churn of existing ones, even though existing customers usually require fewer resources from the organizations. The term customer churn, also referred to as customer attrition, customer turnover, or customer defection, is used to describe loss of clients or customers.

Organizations or organizational units thereof that handle customer interactions are often the richest source of information related to customers. Interactions between a customer and the organization are optionally enabled in multiple technologies, including telephone, video, chat, e-mail, fax and others. Such interactions may be associated with spoken or free written text, as well as unspoken gestures, such as emotional levels or call flow analysis data including for example talkover parameters, forms, screen events occurring on the screen of the agent handling the interaction, text files or streams and others. The interactions may further be associated with additional data, including Computer Telephony-Integration (CTI) data, Customer relationship management (CRM) data, and others.

The interactions are captured and stored, but an agent handling a particular interaction does not always access the data, and may not be aware of the overall situation of a customer, or sensitive enough to preliminary churning signs.

Thus retrospective analysis of the interactions of a churned customer may show that signs to the churning were present in previous interactions, a while before the customer actually churned the organization. Further, such analysis sometimes shows that the churning may have been evitable at the time the interactions took place, but is not evitable once the customer has already announced he or she is churning, and made arrangements with alternative organizations.

Thus there is a need in the art for a method and apparatus that will enable an interaction-rich organization increase customer retention by automatically predicting possible churning of customers, and optionally taking measures to prevent such churning.

SUMMARY

A method and structure for generating and optionally reacting to a combined churn score related to a customer of an organization. The combined churn score is determined as a combination of an interaction churn score and a transaction churn score. When the combined interaction churn exceeds a predetermined threshold, an action is optionally taken.

In a preferred embodiment of the disclosure there is thus provided a method for providing a prediction for customer churn in an organization with which the customer has an interaction, the method comprising determining an interaction churn score for the interaction. The method can further comprise the steps of: determining or receiving a transactional churn score based on additional data related to the customer or to the organization; and combining the interaction churn score and transactional churn score into a combined churn score. The method optionally comprises a step of extracting data from the interaction for determining the interaction churn score. Within the method, the data optionally includes one or more items selected from the group consisting of: speech to text data, word spotting data, emotional level detection data, call flow analysis data, Computer Telephony Integration data, Customer Relationship Management data, or Business Intelligence data. The method optionally comprises a step of making a retention offer to the customer. Within the method, determining the interaction churn score optionally comprises the steps of: categorizing the interaction into one or more categories, by determining one or more category-interaction indications associating each interaction with each category; and combining the category-interaction indications into the interaction churn score. Within the method, combining the category-interaction indications is optionally based on one or more items selected from the group consisting of: a maximal indication between the interaction and the category, and a number of churning categories the interaction is associated with out of a total number of churning categories. The method optionally comprises a step of defining the categories. The method optionally comprises a step of performing quality monitoring for an agent associated with the interaction. The method optionally comprises a step of taking one or more actions, or for generating or handling one or more alerts based on the combined churn score. Within the method the action optionally relates to opening a ticket in a business intelligence system or tool or in a customer relationship management system or tool.

Another aspect of the disclosure relates to an apparatus for providing a prediction for customer churn in an organization with which the customer has an interaction, the apparatus comprising an interaction churn score determination component for determining an interaction churn score related to the interaction. The apparatus can further comprise: a transactional churn score determination component for determining a transaction churn score for the customer, based on additional data related to the customer or to the organization; and a combined churn score determination component for combining the interaction churn score and the transaction churn score into a combined churn score. The apparatus can further comprise an extraction engine for extracting information from the interaction. Within the apparatus, the extraction engine optionally comprises one or more items selected from the group consisting of: a speech to text engine, a word spotting engine, a phonetic search engine, an acoustic extraction engine, and an external feature extraction engine. Within the apparatus, the external feature extraction engine optionally extracts information from one or more items selected from the group consisting of: a Computer Telephony Integration system, a Customer Relationship Management system, and a Business Intelligence system. The apparatus can further comprise a retention offer engine for making a retention offer to the customer. The apparatus can further comprise a category score determination component for determining one or more category-interaction indications associating the interaction with one or more categories. The apparatus can further comprise a category definition component for defining the categories. The apparatus can further comprise a reactive component for taking one or more actions, or for generating or handling one or more alerts based on the combined churn score. Within the apparatus, the action optionally relates to opening a ticket in a business intelligence system or tool, or in a customer relationship management system or tool. The apparatus optionally comprises a quality management component for monitoring a quality parameter of an agent associated with the interaction.

Yet another aspect of the disclosure relates to an apparatus for providing a prediction for customer churn in an organization with which the customer has an interaction, the apparatus comprising: an extraction engine for extracting information from the interaction; a category score determination component for determining one or more category-interaction indications associating the interaction with one or more categories; an interaction churn score determination component for determining an interaction churn score related to the interaction; a transactional churn score determination component for determining a transaction churn score for the customers based on additional data related to the customer or to the organization; a combined churn score determination component for combining the interaction churn score and the transaction churn score into a combined churn score; a retention offer engine for making a retention offer to the customer; and a capturing or logging component for capturing the interaction. The apparatus can further comprise a storage device for storing the categories and parameters thereof. The apparatus can further comprise a quality management component for monitoring a quality parameter of an agent associated with the interaction.

Yet another aspect of the disclosure relates to a computer readable storage medium containing a set of instructions for a general purpose computer, the set of instructions comprising: determining an interaction churn score for an interaction between a customer and an organization; determining a transactional churn score based on additional data related to the customer or to the organization; and combining the interaction churn score and transactional churn score into a combined churn score.

BRIEF DESCRIPTION OF THE DRAWINGS

Exemplary non-limited embodiments of the disclosed subject matter will be described, with reference to the following description of the embodiments, in conjunction with the figures. The figures are generally not shown to scale and any sizes are only meant to be exemplary and not necessarily limiting. Corresponding or like elements are designated by the same numerals or letters.

DETAILED DESCRIPTION

A method and apparatus for avoiding churning and increasing customer retention in call centers, by identifying churning indications earlier then the time at which the customer notifies about his or her churning, and when a corrective action can still be effective. In preferred embodiments, a training set comprising interactions of customers are captured over time, and categories are defined for the interactions. Some categories may relate to possible churning, such as "customer unhappy with price", "customer complaining on service level", "customer explicitly threatening to churn" or the like. Yet other categories may relate to other subjects, like specific products or services, questions, or others. Each category is characterized by parameters, such as words written or spoken within the interaction, emotional level, flow analysis data, and additional data.

The categories are preferably defined so that interactions with customers is who are known to have later churned the organization are more likely to be categorized into at least one of the churning categories than existing customers. Thus, categories are retroactively defined by considering interactions when their future developments are already known.

Then, at production time, as interactions are captured or stored, each interaction is analyzed in order to extract data such as spoken or written text, emotional level, flow analysis data such as talkover parameters and others, as well as meta data such as Computer telephony Integration (CTI) data, Customer Relationship Management (CRM) data and others. Each interaction is then categorized and is assigned a score for each category. The score represents to what extent the interaction belongs to the category. All scores are combined into an interaction churning score. If the interaction churning score exceeds a predetermined threshold an action is taken, such as notifying an agent, escalating the case to a customer retention department, optionally generating retention offer recommendation to the agent, or sending a retention offer to the customer.

In addition, a transactional churning score is determined for the particular customer, based on additional data such as but not limited to billing information or billing trends, customer service agreements, and additional parameters. The transactional churning score can be generated by proprietary engines or components or by third-party products.

A combined churning score is then determined, comprised of the interaction churning score and the transaction churning score. If the combined churning score exceeds a threshold, then an action is taken, such as notifying an agent, escalating the case to a customer retention department, making further retention offers, or the like.

Figure 1:
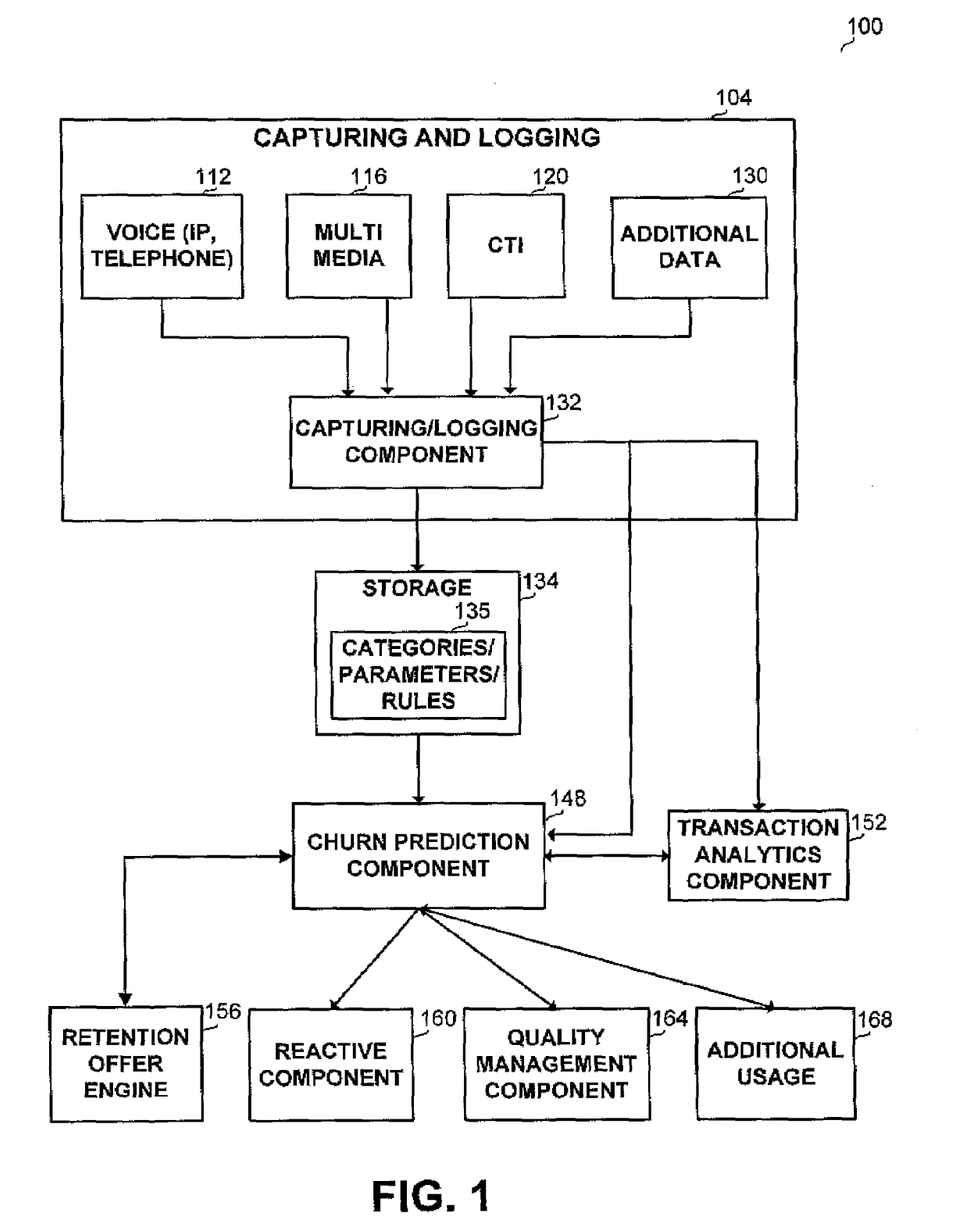
FIG. 1 is a schematic illustration of typical environment in which the disclosed invention is used.

Referring now to FIG. 1, showing a block diagram of the main components in a typical environment in which the disclosed invention is used. The environment, generally referenced 100, is an interaction-rich organization, handling interactions with customers, typically a call center of a financial institute such as a bank, a trading floor, or an insurance company, a communications service provider contact center, customer service outsourcing center or the like. Interactions with customers, users, leads, employees, business partners, or other contacts are captured, thus generating input information of various types. Each organization may comprise one or more sites, i.e. geographic locations in which interactions are handled. The information types include vocal interactions, interactions comprising a vocal component, non-vocal interactions, organizational data and additional data. Interactions comprising a vocal component optionally include telephone calls 112, made using any device, such as a landline phone or a cellular phone, and transmitted using any technology, such as analog lines, voice over IP (VoIP) or others. The capturing of voice interactions can employ many forms and technologies, including trunk side, extension side, summed audio, separate audio, various encoding and decoding protocols such as G729, G726, G723.1, and the like. The voice typically passes through a PABX (not shown), which in addition to the voice of the two or more sides participating in the interaction, collects additional information discussed below. The interactions can further include face-to-face interactions, such as those recorded in a walk-in-center, and additional sources of vocal data, such as microphone, intercom, the audio part of a video capturing such as a video conference, vocal input by external systems or any other source. Another source of collected information includes multi media information 116, which comprises interactions or parts thereof, such as video conferences, e-mails, chats, screen events including text entered by the agent handling the call, buttons pressed, links to additional interactions in which one of the participants in the current interaction participated, or any other information relevant to the interaction or to the participants, which may reside within other applications or databases. In addition, the environment receives Computer Telephony Integration (CTI) and PABX information 120, including start and end time, ring time, hold time, queue time, call wrap up time, number of participants, hold time, abandon from hold, hang-up side, abandon from queue, number and length of hold periods, transfer events, number called, number called from, DNIS, VDN, ANI, or the like. The environment further collects additional data 130 from other sources such as CRM data, or any other internal or third party data.

Data from all the above-mentioned sources and others is captured and preferably logged by capturing/logging unit 132. Capturing/logging unit 132 comprises a computing platform running one or more computer applications as detailed below. The captured data is optionally stored in storage 134, which is preferably a mass storage device, for example an optical storage device such as a CD, a DVD, or a laser disk; a magnetic storage device such as a tape or a hard disk; a semiconductor storage device such as Flash device, memory stick, or the like. The storage can be common or separate for different types of captured interactions and different types of additional data. Alternatively, the storage can be remote from the site of capturing and can serve one or more sites of a multi-site organization. Storage 134 further optionally stores categories, parameters and rules 135, describing categories with which the interactions may be associated, the features or measures to be extracted or evaluated from audio files, text files, environmental parameters, manually entered parameters or others. The categories, features, parameters, or rules are transferred from storage 134 or directly from capturing/logging unit 132 without being stored, to a churn prediction component 148, further detailed in association with FIG. 3 below. Churn prediction component 148 uses the relevant information and generates an interaction churn score. The interaction churn score is further enhanced with a transactional interaction score generated by transaction analytics component 152, to generate a combined churn score. Transaction analytics component 152 can be implemented as part of churn prediction component 148 or as an external proprietary or third party tool. The combined churn score may be transferred to and used by multiple groups and components in the organization. As non-limiting examples, the score can be used by retention offer engine 156 for making retention offers to customers. The retention offer can be made after the combined churn score is determined, or as a first aid measure, even before the combined churn score is determined. The retention offer can comprise an improved deal for the customer, such as higher value or lesser payment, a present, a special deal on other products or services or the like. The combined churn score is optionally further transmitted to a reactive component 160 for generating an alert such as an e-mail or other notification, or transferring the interaction to a reactive team or to another unit responsible for handling customers who may be in a process of churning. The scores can be further used in a quality management component 164 used for assessing and improving the quality of service provided by the agent who handled one of the customer interactions by a supervisor, team leader or another person associated with the environment. The score can be further used by any additional component 168 intended for any other purpose, such as reporting, Automatic Call Distribution (ACD), input to service, marketing, or product departments, or other systems and purposes. The output is optionally transferred also to any storage component which can be a part of storage 134 or separate, or to alert generation component 152. The alert can take any form, such as transferring a call, providing an on-screen alert, sending an e-mail, fax, SMS, telephone message or others to a person in charge, updating a database or other actions. The alert can be generated if a particular word or key phrase was found, if enhancing the text provides exceptional results, in which case it may be required to repeat training, or the like.

All components of the system, including capturing/logging components 132, churn prediction component 148, retention offer engine 156, quality management component 164 and others are preferably implemented as one or more applications executed on one or more computing platforms, such as a personal computer, a mainframe computer, or any other type of computing platform provisioned with a memory device (not shown), a Central Processing Unit (CPU) or microprocessor device, and several I/O ports (not shown). Each application is a set of logically inter-related computer programs, modules, or other units and associated data structures that interact to perform one or more specific tasks. All applications can be co-located and run on the same one or more computing platform, or on different platforms, optionally located in different geographic locations. Alternatively the components are implemented as firmware ported for a specific processor such as digital signal processor (DSP) or microcontrollers, or can be implemented as hardware or configurable hardware such as field programmable gate array (FPGA) or application specific integrated circuit (ASIC).

Some of the components such as transaction analytics component 152, quality management component 164 and others can be third party tools adapted to function with components of the environment using any communication or data transfer protocol or means.

Figure 2A:
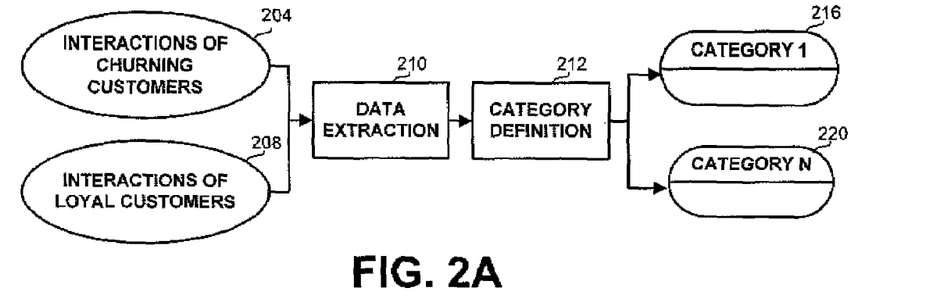
FIG. 2A is a flowchart of the main steps in a method for constructing categories, in accordance with an implementation of the disclosure.
Figure 2B:
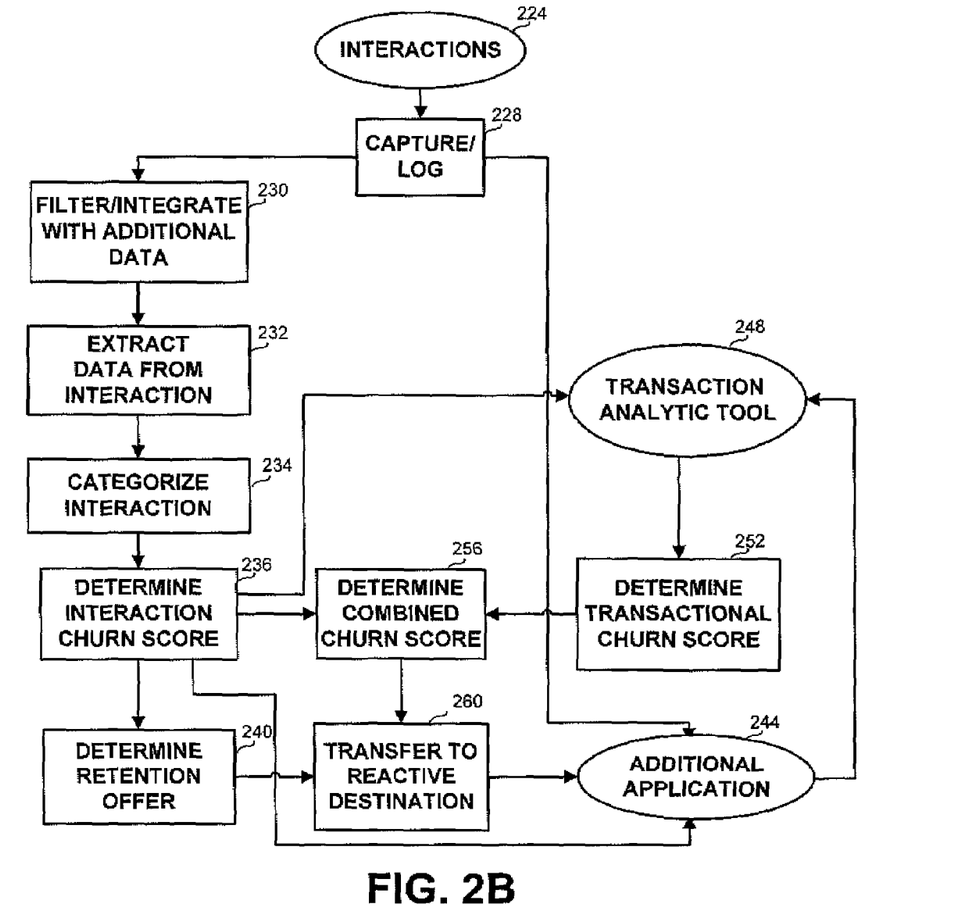
FIG. 2B is a flowchart of the main steps of a churn prediction method, in accordance with an implementation of the disclosure.

Referring now to FIGS. 2A and 2B, showing flow charts of the main steps in methods for constructing categories and predicting churn.

FIG. 2A is a flowchart showing the data flow and steps in a method for creating the categories for churn prediction. The method starts by collecting interactions 204 of customers known to have later churned the organization, and interactions 208 of customers known to have stayed with the organization at the time the data is collected. The interactions preferably include the last few interactions of each customer, preferably at least the last three or four interactions. On step 210 data related to the interactions is extracted. The data preferably includes meta data such as CTI data, CRM data and others, as well as data extracted from the interactions, including full or partial transcription, spotted words, emotional levels, flow analysis data such as talkover parameters, silence periods on either side and others.

On step 212 categories are defined, such as category 1 (216) and further categories, until category N (220). Each category is defined according to parameters such as predetermined words appearing in the interaction, predetermined CTI events, emotional levels, or the like. Each interaction can be tested against the definition of each category, and be assigned a score indicating to what extent the interaction is associated with the category. For example, categories can be defined which relate to certain products. Thus, an interaction in which two products are mentioned may be assigned high score in relation to the two categories. Preferably, at least some of the categories are defined so that interactions of churned customers are likely to be assigned a higher score in association with these categories than interactions related to non-churning customers. Such categories may include customers complaining on price or service level, or other categories, which preferably relate to events that can be detected a while before the customer churned.

The output of the method is a list of categories, and a definition of the score to be assigned to an interaction in association with the category. Such criteria can comprise for example a weighted sum of the number of words out of a predetermined list appearing in the interaction (capped by a predetermined number), plus the highest emotional level detected in the interaction (capped by another predetermined number). A category can optionally be assigned a name indicating the intent of the person who defines the category. The category and criteria definition can be done manually or using automatic tools which receive the extracted and additional information. In yet another embodiment, the categories are defined using a combination of automatic tools and manual supervision and correction.

Referring now to FIG. 2B, showing a flowchart of the main steps in a churn prediction method. Interactions 224, including voice interactions, textual interactions, video conferences and others, as well as metadata related to the interactions are captured and optionally logged. On optional step 230, the interactions are integrated with metadata, or filtered according to meta data, such as related CTI or CRM information, or other data external to the interaction. On step 232 data is extracted from the interaction itself, for example by transcription, word spotting, emotion detection, talkover analysis and additional tools. It will be appreciated that step 230 and step 232 can be performed in parallel or one after the other, Alternatively, step 230 can be used for filtering interactions, so no further processing, and in particular step 232 is required. For example, a first interaction by a customer, an interaction with a non-customer, an extremely short interaction or the like can be filtered since they usually pose no churning risk.

On step 234, the interactions are automatically categorized into the predefined categories, based on the additional data and/or the extracted data. The categorization results comprise for each interaction a numeric score for each category, indicating the whether the interaction belongs to the category and the extent to which the interaction is related to the category. Alternatively, step 234 can provide a Boolean indication for each interaction in association with each category, wherein a value of TRUE indicates that the interaction is associated with the category, and a value of FALSE indicates that the interaction is not associated with the category. In yet another alternative, a Boolean indication is provided indicating whether a call is related to a category and a number indicating to which extent the call is associated with the category.

On step 236, an interaction churn score is determined for the interaction, based on the scores associated with the categories. In a preferred implementation, the interaction churn score can be determined according to the following formula:

$$A * \left( \begin{array}{c} \text{Maximal score for} \\ \text{churning category} \end{array} \right) + B * \left[ \left( \frac{\text{\# of churning categories interaction belongs to}}{\text{Total number of churning categories}} \right) * 100 \right]$$

Wherein A and B are predetermined numbers, the score for a churning category is preferably in the range of 0 ... 100, and optionally wherein A+B=1. An interaction is indicated to belong to a category if step 234 provided a TRUE value for the interaction being associated with the category, or a numerical score obtained for the interaction in association with the category on step 234 exceeds a predetermined value. It will be appreciated by a person skilled in the art that determining the interaction churn score can be performed in a multiplicity of ways, and is not limited to the formula above.

This left-hand part of the formula, relating to the maximal score of the interaction in association with a churning category, reflects a maximal risk degree posed by critical interactions, and eliminates the averaging effect that conceals such cases. The formula thus causes the escalation of critical cases, even if due to any reason the interaction was associated with only one category. However, even if some words or other events are used in multiple categories, they will be further effect on the right-hand side of the formula, so the left hand side neutralizes their effect.

The right-hand part of the formula, relating to the number of churning categories the interaction is associated with, out of the total number of churning categories, may generally give higher rates to interactions in which multiple subjects are raised, differentiates interactions having high score in one or few categories only, relatively to interactions that are assigned with high score to multiple categories. The value distribution of the right-hand part of the formula is affected by the number of categories in the model. For example, if a model contains 3 categories, the possible values would be 0, 33, 66, and 100, while for a 5 category model the possible values would be 0, 20, 40, 60, 80, and 100. Therefore, predetermined parameter B is used to moderate the values distribution effect. The right-hand part of the formula also provides for easier dynamic maintenance of the categories, including category modifications, additions and deletions.

The combination of the two parts enables dynamic weighting of the two parts and giving higher weight to different types of calls, and also enables a user to set the values of A and B after a pilot run and results analysis.

If it is a goal of the system and method to receive as few as possible false alarms and thus not waste manpower on handling regular calls, then a if the interaction churn score is below a predetermined threshold, the process is stopped for the particular interaction. However, if it is important to miss as few important calls as possible, then the process continues for any interaction, regardless of the interaction churn score.

On step 240, a retention offer is optionally sent to the customer associated with the interaction. The offer may serve as a first-aid to make the customer feel better about the organization, product or service, until a personnel member will examine the case and see if there is indeed a significant churning rate. The retention offer model is aligned with the customer preferences as known or assumed by the organization, and is aimed to maximize the cost-effectiveness of the retention offers. For example, offering a high priced retention package to a low value customer is financially inefficient. The model is based on analysis of historical data associated with the customer, including past retention offers and their effect, and past offers that have proven to have positive effects in similar cases in the past, while maintaining a high cost-effectiveness ratio. The retention offers can be determined using automatic techniques such as pattern recognition and statistical models such as linear regression, correlation, and root cause analysis, or manual techniques based on commonsense or past experience. For example, churning of a customer of a cellular operator, the customer having a high volume of calls, can be prevented by offering the user free air time every month. Churning of young customers, however, can be prevented by offering them a number of free Sort Messages (SMSs), and churning of older customers might be prevented by offering them reduced price in calling family members, or the like.

The transactions and optionally the interaction churn score or additional data received or generated during the interaction churn score determination, such as spotted words, emotional levels detected within the interaction, CTI events and others are optionally transferred to additional application 244, such as CRM, CTI, Business Intelligence (BI) or others. The interactions and optionally the data from system 244 relating to other interactions of the customer, the customer's agreements, and further data are transferred to transaction analytic tool 248, such as but not limited to SAS Enterprise Miner™ produced by SAS (www.sas.com), which on step 252 analyzes the customer's situation and determines a transaction churn score. Optionally, data received or generated during the interaction churn score determination, such as spotted words, emotional levels detected within the interaction, CTI events, the root cause of the interaction or others, are transferred to transaction analytic tool 248 in order to further enhance its operation in the current case, or for learning trends and other data to be used in future cases. The transaction churn score is preferably determined based on behavioral indicators, including but not limited to customer seniority, customer past and present value, customer contract expiry date, customer demographic data such as age, gender, geographic residence and others, usage patterns such as call business volume and others, number of interactions with the call center and reasons thereof, additional services the customer is consuming, such as roaming services for a cellular operator, and others. It will be appreciated that transaction analytic tool 248 can be a part of additional application 244, or comprise a separate system.

On step 256 a combined churn score is determined based on the transaction churn score, together with the interaction churn score. The combined churn score takes into account the specific interaction as well as data extracted from the specific interaction and related meta data, together with indications from the accumulated history of the customer with the organization, to produce a prediction that the customer may churn the organization. If the combined churn score exceeds a predetermined threshold, it is transferred on step 260 to additional destination, preferably a reactive destination, such as a reactive team, other dedicated personnel, or the like, together with all the relevant information. Optionally, the data is transferred to different destinations based on the combined churn score. For example, churn scores between 90 and 100 out of 100 will be transferred to an emergency reactive team, while scores between 50 and 90 will be transferred to another team. The reactive destination is responsible for generating or responding to an alert, or for taking an action, such as but not limited to, for example, to opening a ticket or a call in a BI, CRM or any other system or tool, third party tool, based on the combined churn score. It will be appreciated that the reactive destination can further receive data related to the interaction, to the customer or to the organization, including words spotted within the interaction, emotional levels, CTI events, the root cause of the call as analyzed by the system, or others.

It will be appreciated by a person skilled in the art that interaction score determination step 236, retention offer determination 240, and transactional score determination step 252 can be performed simultaneously, or in any other order, since none of step 236, 240 and 252 depends on the others. However, steps 236 and 252 must be completed in order for combined churn determination step 256 to take place for determining the combined churn score must be performed.

Figure 3:
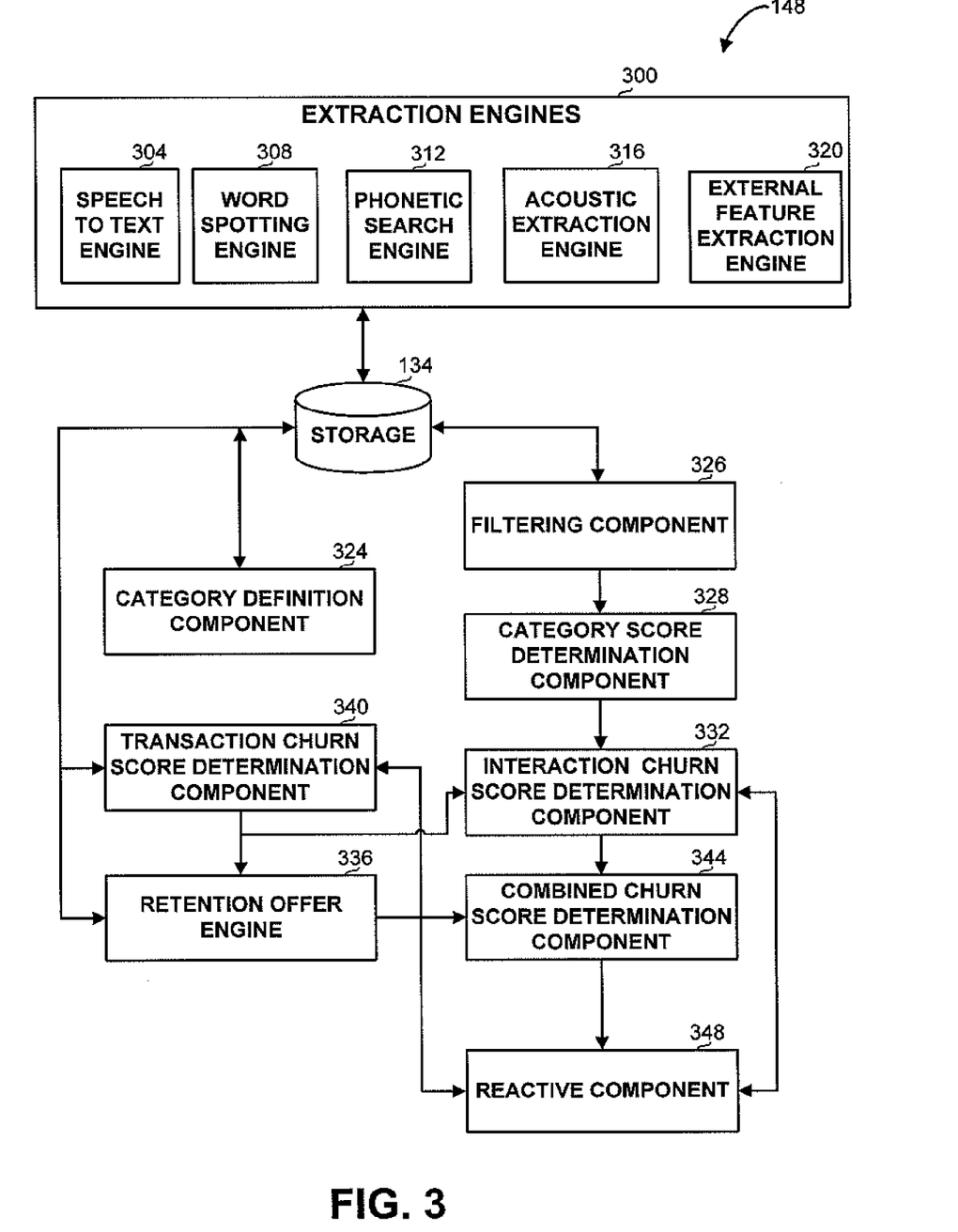
FIG. 3 is a block diagram of the main components in an apparatus for predicting customer churn and enhancing customer retention, in accordance with an implementation of the disclosure.

Referring now to FIG. 3, showing a block diagram of a churn prediction apparatus, generally referred as component 148 of FIG. 1. It will be appreciated that for clarity, FIG. 3 repeats some elements of FIG. 1. Such corresponding elements are numbered identically. The churn prediction apparatus is optionally implemented as sets of computer instructions performed by computing platforms, interacting to carry out the methods of FIGS. 2A and 2B. The apparatus comprises extraction engines 300, which comprise at least one of speech to text engine 304 for transcribing vocal interactions, word spotting engine 308 for spotting predetermined words within the interactions, or another engine supplying text out of audio files or streams. Extraction engines 300 optionally further comprise phonetic search engine 312 for locating sequences of phonemes within audio, acoustic extraction engine 316, for retrieving acoustic features from the audio input, such as talkover parameters, emotion indicators or other features; and external feature extraction engine 320 for extracting parameters from external sources or systems, for example extracting CTI data such as the called number or calling number, organizational databases, CRM data, BI data or others. External feature extraction engine 320 provides filtering or additional information, while engines 304, 308, 312 and 316 provide information extracted from the interaction itself.

The apparatus further comprises category definition component 324 for defining categories, include churning-related categories and other categories, and the parameters upon which the association of an interaction with the specific category is determined. The association can be determined as a TRUE or FALSE value, or as a numeric value. The categories, as well as the parameters and optionally additional data are stored in storage 134. The apparatus further comprises filtering component 326 for filtering interactions according to additional data. For example, a first call by a non-customer can usually not predict a churn, so further examination may be a waste of resources and should thus be eliminated. A further component is category score determination component 328 for determining the association of an interaction with a category. The association is determined according to the category's parameters, as determined by category definition component 324. The output of category score determination component 328 is an association level or an indication for each combination of interaction and category, whether or to what extent the interaction is associated with the category. All association levels are transferred to interaction churn score determination component 332 for determining a total churn score for the interaction. The total score is optionally determined according to the formula detailed in association with step 236 of FIG. 2 above.

The apparatus further comprises a transaction churn score determination component 340, which is optionally a third party product, such as Enterprise Miner manufactured by SAS (www.sas.com) which analyzes customers' transactional activities. This analysis is based on the predefined predictive churn model, which identifies the customer's activities, such as a decrease in call volume, number of calls to the call center, cancellation of various packages and services that are known indicators of potential churn, and others. The model is based on historical data of the customer and the organization. A further component is retention offer engine 336 which determines according to the interaction and possibly additional data whether and which retention offer should be made to the customer. The interaction churn score and transaction churn score are transferred to combined churn score determination component 344 which combined them and outputs a total churn prediction. The total churn prediction is transferred to reactive component 348, which handles customers having high churn score. In one alternative, all scores are transferred to component 348 that filters which customers should be given special attention. In another embodiment, only total scores exceeding a predetermined threshold are transferred to reactive component 348. Reactive component 348 can send an indication to an operator, publish a method, update data within a database, send a further retention offer or perform any other operation.

The disclosed method and apparatus provide early alert for customer churn, thus increase customer retention. The method and apparatus integrate data and meta data extracted from or related to particular interactions, with overall analysis of the customer's behavior and business history. The combined churn score is based on substantially all possible information and is therefore more predicative than estimation based on lesser information. The method and apparatus are also integrated with a retention offer engine suggesting retention offers, for providing either first-aid when churning chances are increasing and before more targeted or personal action can take place, or as part of an overall plan for compensating a customer. Churning predictions related to one or more can also generate an alert or be otherwise used in a quality monitoring system and process. Quality monitoring is performed as part of agent evaluation, in order to identify strengths and weaknesses and compensate or train the agent accordingly. A person skilled in the art will appreciate that the disclosed method and apparatus can be used for optimizing business processes, for example in order to ensure that service level agreements reduce churn. The method and apparatus can also be used for generating customer lifetime value prediction models that can later be used to further reduce churn in a cost effective way.

It will be appreciated by a person skilled in the art that the disclosed apparatus is exemplary and schematic, and that components can be changed, added or eliminated. Further, activities can be exchanged between components without deviating from the spirit of the disclosure.

It will be further appreciated that multiple variations and options can be designed along the guidelines of the disclosed method.

While the disclosure has been described with reference to exemplary embodiments, it will be understood by those skilled in the art that various changes may be made and equivalents May be substituted for elements thereof without departing from the scope of the disclosure. In addition, many modifications may be made to adapt a particular situation, material, step of component to the teachings without departing from the essential scope thereof. Therefore, it is intended that the disclosed subject matter not be limited to the particular embodiment disclosed as the best mode contemplated for carrying out this invention, but only by the claims that follow.

The invention claimed is:

1. A method for calculating an interaction churn score in an organization with which the customer has an interaction, the method comprising:
receiving a plurality of categories, each category characterized by an at least one parameter of a voiced expression;
capturing or logging the interaction using a capturing or logging component;
based on a determined relation of data of the interaction to churning, categorizing the interaction into at least one churning category out of a total number of categories according to an extent to which the data of the interaction belongs to the least one churning category, and determining a number of churning categories into which the interaction is categorized; and
determining an interaction churn score for the interaction, wherein the interaction churn score comprises a term directly related to the number of churning categories the interaction is categorized into and inversely related to the total number of churning categories based on a formula as:

$$A*(\text{maximal score for a churning category})+B*((\text{the number of churning categories into which the interaction is categorized})/(\text{the number of churning categories})*100),$$

wherein A and B are coefficients that satisfy a condition of $A+B=1$; and
wherein capturing or logging the interaction and determining an interaction churn score for the interaction are carried out using a computing platform provisioned with a memory device.

2. The method of claim 1 further comprising the steps of determining or receiving a transactional churn score based on additional data related to the customer or to the organization; and
combining the interaction churn score and transactional churn score into a combined churn score.

3. The method of claim 1 further comprising a step of extracting data from the interaction for determining the interaction churn score.

4. The method of claim 3 wherein the data includes at least one item selected from the group consisting of:
speech to text data, word spotting data, emotional level detection data, call flow analysis data, Computer Telephony Integration data, Customer Relationship Management data, or Business Intelligence data.

5. The method of claim 1 further comprising a step of making a retention offer to the customer.

6. The method of claim 1 wherein determining the interaction churn score comprises the steps of:
categorizing the interaction into at least one category, by determining at least one category-interaction indication associating the interaction with the at least one category; and
combining the at least one category-interaction indication into the interaction churn score.

7. The method of claim 6 wherein combining the at least one category-interaction indication is based on at least one item selected from the group consisting of: a maximal indication between the interaction and the at least one category, and a number of churning categories the interaction is associated with out of a total number of churning categories.

8. The method of claim 6 further comprising a step of defining the at least one category.

9. The method of claim 1 further comprising a step of performing quality monitoring for an agent associated with the interaction.

10. The method of claim 1 further comprising a step of performing at least one action, or for generating or handling at least one alert based on the combined churn score.

11. The method of claim 10 wherein the action relates to opening a ticket in a business intelligence system or tool or in a customer relationship management system or tool.

12. The method of claim 1 wherein the interaction is categorized into at least two categories.

13. The method of claim 1 further comprising
determining a category-interaction indication for each category the interaction is categorized into, and determining a maximal indication among all indications associated with churning categories, wherein the interaction churn score increases as the maximal indication increases.

14. The method according to claim 1, wherein each category is characterized based on former interactions.

15. The method according to claim 1, wherein the categories are provided by a user.

16. An apparatus for calculating an interaction churn score in an organization with which the customer has an interaction, the apparatus comprising:
a voice recording device for capturing the interaction;
a category definition component for defining a plurality of categories, each category characterized by an at least one parameter of a voiced expression;
a categorization component for categorizing the interaction, based on a determined relation of data of the interaction to churning, into at least one churning category out of a total number of categories according to an extent to which the data of the interaction belongs to the least one churning category;
an interaction churn score determination component for determining an interaction churn score related to the interaction,
wherein the interaction churn score comprises a term directly related to the number of churning categories the interaction is categorized into and inversely related to the total number of churning categories based on a formula as:

$A*$(maximal score for a churning category)$+B*$((the number of churning categories into which the interaction is categorized)/(the number of churning categories)*100), wherein A and B are coefficients that satisfy a condition of A+B=1; and
wherein the cited components comprise processing apparatus configured to perform the corresponding tasks cited above.

17. The apparatus of claim 16 further comprising:
a transactional churn score determination component for determining a transaction churn score for the customer, based on additional data related to the customer or to the organization; and
a combined churn score determination component for combining the interaction churn score and the transaction churn score into a combined churn score
wherein the cited components comprise processing apparatus configured to perform the corresponding tasks cited above.

18. The apparatus of claim 16 further comprising an extraction engine for extracting information from the interaction,
wherein the cited engine comprises processing apparatus configured to perform the corresponding task cited above.

19. The apparatus of claim 18 wherein the extraction engine is at least one item selected from the group consisting of: a speech to text engine, a word spotting engine, a phonetic search engine, an acoustic extraction engine, and an external feature extraction engine.

20. The apparatus of claim 19 wherein the external feature extraction engine extracts information from at least one item selected from the group consisting of: a Computer Telephony Integration system, a Customer Relationship Management system, and a Business Intelligence system.

21. The apparatus of claim 16 further comprising a retention offer engine for making a retention offer to the customer,
wherein the cited engine comprises processing apparatus configured to perform the corresponding task cited above.

22. The apparatus of claim 16 further comprising a category score determination component for determining at least one category-interaction indication associating the interaction with at least one category,
wherein the cited component comprises processing apparatus configured to perform the corresponding task cited above.

23. The apparatus of claim 22 further comprising a category definition component for defining the at least one category,
wherein the cited component comprises processing apparatus configured to perform the corresponding task cited above.

24. The apparatus of claim 16 further comprising a reactive component for taking at least one action, or for generating or handling at least one alert based on the combined churn score,
wherein the cited component comprises processing apparatus configured to perform the corresponding task cited above.

25. The apparatus of claim 24 wherein the action relates to opening a ticket in a business intelligence system or tool, or in a customer relationship management system or tool.

26. The apparatus of claim 16 further comprising a quality management component for monitoring a quality parameter of an agent associated with the interaction,
wherein the cited component comprises processing apparatus configured to perform the corresponding task cited above.

27. The apparatus of claim 16 wherein categorization component is adapted to categorize the interaction into at least two categories,
wherein the cited component comprises processing apparatus configured to perform the corresponding task cited above.

28. The apparatus of claim 16
wherein the categorization component determines a category-interaction indication for each category the interaction is categorized into, and
wherein the interaction churn score determination component determines a maximal indication among all indications associated with churning categories into which the interaction is categorized, and
wherein the interaction churn score increases as the maximal indication increases and wherein the cited components comprise processing apparatus configured to perform the corresponding tasks cited above.

29. The apparatus according to claim 16, wherein each category is characterized based on former interactions.

30. The apparatus according to claim 16, wherein the categories are provided by a user.

31. An apparatus for calculating an interaction churn score in an organization with which the customer has an interaction, the apparatus comprising:
a voice recording device for capturing the interaction;
a category definition component for defining a plurality of categories, each category characterized by an at least one parameter of a voiced expression;
an extraction engine for extracting information from the interaction;
a category score determination component for determining at least one category-interaction indication associating the interaction with at least one churning category out of a total number of categories;
an interaction churn score determination component for determining an interaction churn score related to the interaction, wherein the interaction churn score comprises a term directly related to the number of churning categories the interaction is associated with and inversely related to the total number of churning categories based on a formula as:

$$A*(\text{maximal score for a churning category})+B*((\text{the number of churning categories into which the interaction is categorized})/(\text{the number of churning categories})*100),$$

wherein A and B are coefficients that satisfy a condition of A+B=1;

a transactional churn score determination component for determining a transaction churn score for the customer, based on additional data related to the customer or to the organization;

a combined churn score determination component for combining the interaction churn score and the transaction churn score into a combined churn score;

a retention offer engine for making a retention offer to the customer; and a capturing or logging component for capturing the interaction; and wherein the cited components comprise processing apparatus configured to perform the corresponding tasks cited above and wherein the cited engines comprise processing apparatus configured to perform the corresponding tasks cited above.

32. The apparatus of claim 31 further comprising a storage device for storing the at least one category and parameters thereof.

33. The apparatus of claim 31 further comprising a quality management component for monitoring a quality parameter of an agent associated with the interaction,
    wherein the cited component comprises processing apparatus configured to perform the corresponding task cited above.

34. The apparatus according to claim 31, wherein each category is characterized based on former interactions.

35. The apparatus according to claim 31, wherein the categories are provided by a user.

36. A non-transitory computer readable storage medium containing a set of instructions for a general purpose computer, the set of instructions comprising:
    receiving a plurality of categories, each category characterized by an at least one parameter of a voiced expression;
    based on a determined relation of data of the interaction to churning, categorizing the interaction into at least one churning category out of a total number of categories according to an extent to which the data of the interaction belongs to the least one churning category, and determining a number of churning categories into which the interaction is categorized; and
    determining an interaction churn score for an interaction between a customer and an organization, wherein the interaction churn score comprises a term directly related to the number of churning categories the interaction is categorized into and inversely related to the total number of churning categories based on a formula as:

$$A*(\text{maximal score for a churning category})+B*((\text{the number of churning categories into which the interaction is categorized})/(\text{the number of churning categories})*100),$$

wherein A and B are coefficients that satisfy a condition of A+B=1;

determining a transactional churn score based on additional data related to the customer or to the organization; and combining the interaction churn score and transactional churn score into a combined churn score.

37. A method for calculating an interaction churn score in an organization with which the customer has an interaction, the method comprising:
    receiving a plurality of categories, each category characterized by an at least one parameter of a voiced expression;
    capturing or logging the interaction using a capturing or logging component;
    based on a determined relation of data of the interaction to churning, categorizing the interaction into at least one churning category out of a total number of categories according to an extent to which the data of the interaction belongs to the least one churning category;
    determining a number of churning categories into which the interaction is categorized;
    determining the maximal score for a churning category;
    determining the number of churning categories;
    determining an interaction churn score for the interaction, wherein the interaction churn score comprises a term directly related to the number of churning categories the interaction is categorized into and inversely related to the total number of churning categories using a formula:

$$A*(\text{maximal score for a churning category})+B*((\text{the number of churning categories into which the interaction is categorized})/(\text{the number of churning categories})*100),$$

wherein A and B are coefficients set by a user and satisfy a condition of A+B=1; and further wherein at least the capturing or logging the interaction and determining the interaction churn score for the interaction are carried out using a computing platform provisioned with a memory device, wherein the cited component comprises processing apparatus configured to perform the corresponding task cited above.

38. The method according to claim 37, wherein each category is characterized based on former interactions.

39. The method according to claim 37, wherein the categories are provided by a user.

40. The method according to claim 37, wherein the coefficients are based on a pilot run and analysis of results thereof.

41. An apparatus for calculating an interaction churn score in an organization with which the customer has an interaction, the apparatus comprising:
    a voice recording device for capturing the interaction;
    a category definition component for defining a plurality of categories, each category characterized by an at least one parameter of a voiced expression;
    a categorization component for categorizing the interaction, based on a determined relation of data of the interaction to churning, into at least one churning category out of a total number of categories according to an extent to which the data of the interaction belongs to the least one churning category;
    an interaction churn score determination component for determining an interaction churn score related to the interaction,
    wherein the interaction churn score comprises a term directly related to the number of churning categories the interaction is categorized into and inversely related to the total number of churning categories using a formula:

$$A*(\text{maximal score for a churning category})+B*((\text{number of churning categories into which the interaction is categorized})/(\text{number of churning categories})*100),$$

wherein A and B are coefficients set by a user and satisfy a condition of A+B=1; and wherein the cited components comprise processing apparatus configured to perform the corresponding tasks cited above.

42. The apparatus according to claim 41, wherein each category is characterized based on former interactions.

43. The apparatus according to claim 41, wherein the categories are provided by a user.

44. The apparatus according to claim 41, wherein the coefficients are based on a pilot run and analysis of results thereof.

45. An apparatus for calculating an interaction churn score in an organization with which the customer has an interaction, the apparatus comprising:
   a voice recording device for capturing the interaction;
   a category definition component for defining a plurality of categories, each category characterized by an at least one parameter of a voiced expression;
   an extraction engine for extracting information from the interaction;
   a category score determination component for determining at least one category-interaction indication associating the interaction with at least one churning category out of a total number of categories;
   an interaction churn score determination component for determining an interaction churn score related to the interaction, wherein the interaction churn score comprises a term directly related to the number of churning categories the interaction is associated with and inversely related to the total number of churning categories using a formula:

$A*$(maximal score for a churning category)$+B*$((number of churning categories into which the interaction is categorized)/(number of churning categories)*100), wherein A and B are coefficients set by a user and satisfy a condition of A+B=1;
   a transactional churn score determination component for determining a transaction churn score for the customer, based on additional data related to the customer or to the organization;
   a combined churn score determination component for combining the interaction churn score and the transaction churn score into a combined churn score;
   a retention offer engine for making a retention offer to the customer; and
   a capturing or logging component for capturing the interaction; and
   wherein the cited components comprise processing apparatus configured to perform the corresponding tasks cited above and wherein the cited engines comprise processing apparatus configured to perform the corresponding tasks cited above.

46. The apparatus according to claim 45, wherein each category is characterized based on former interactions.

47. The apparatus according to claim 45, wherein the categories are provided by a user.

48. The apparatus according to claim 45, wherein the coefficients are based on a pilot run and analysis of results thereof.

49. A non-transitory computer readable storage medium containing a set of instructions for a general purpose computer, the set of instructions comprising:
   receiving a plurality of categories, each category characterized by an at least one parameter of a voiced expression;
   based on a determined relation of data of the interaction to churning, categorizing the interaction into at least one churning category out of a total number of categories, and determining a number of churning categories into which the interaction is categorized according to an extent to which the data of the interaction belongs to the least one churning category; and
   determining an interaction churn score for an interaction between a customer and an organization, wherein the interaction churn score comprises a term directly related to the number of churning categories the interaction is categorized into and inversely related to the total number of churning categories using a formula:

$A*$(maximal score for a churning category)$+B*$((number of churning categories into which the interaction is categorized)/(number of churning categories)*100), wherein A and B are coefficients set by a user and satisfy a condition of A+B=1;
   determining a transactional churn score based on additional data related to the customer or to the organization; and
   combining the interaction churn score and transactional churn score into a combined churn score.

* * * * *